United States Patent
Weber

[11] 3,844,059
[45] Oct. 29, 1974

[54] FISHING DEVICE
[76] Inventor: Russell W. Weber, N88 W14822 Main St., Menomonee Falls, Wis. 53051
[22] Filed: Oct. 17, 1973
[21] Appl. No.: 407,341

[52] U.S. Cl. .............................................. 43/43.13
[51] Int. Cl. ........................................... A01k 95/00
[58] Field of Search ................................... 43/43.13

[56] References Cited
UNITED STATES PATENTS
| | | | |
|---|---|---|---|
| 2,273,209 | 2/1942 | Louthan | 43/43.13 |
| 2,801,491 | 8/1957 | Lawrence | 43/43.13 |
| 2,883,787 | 4/1959 | Dahl | 43/43.13 |
| 3,023,537 | 3/1962 | Madson | 43/43.13 |
| 3,755,955 | 9/1973 | Saia | 43/43.13 |

Primary Examiner—Louis G. Mancene
Assistant Examiner—Daniel J. Leach
Attorney, Agent, or Firm—Arthur L. Morsell, Jr.

[57] ABSTRACT

A diving sinker has a flat member for causing the sinker to dive when it is drawn through the water during trolling. A weight is movably attached to the diving sinker. By varying the position of the weight with respect to the axis of the trolling line, the lateral position of the diving sinker with respect to a boat may be controlled.

8 Claims, 6 Drawing Figures

PATENTED OCT 29 1974 3,844,059
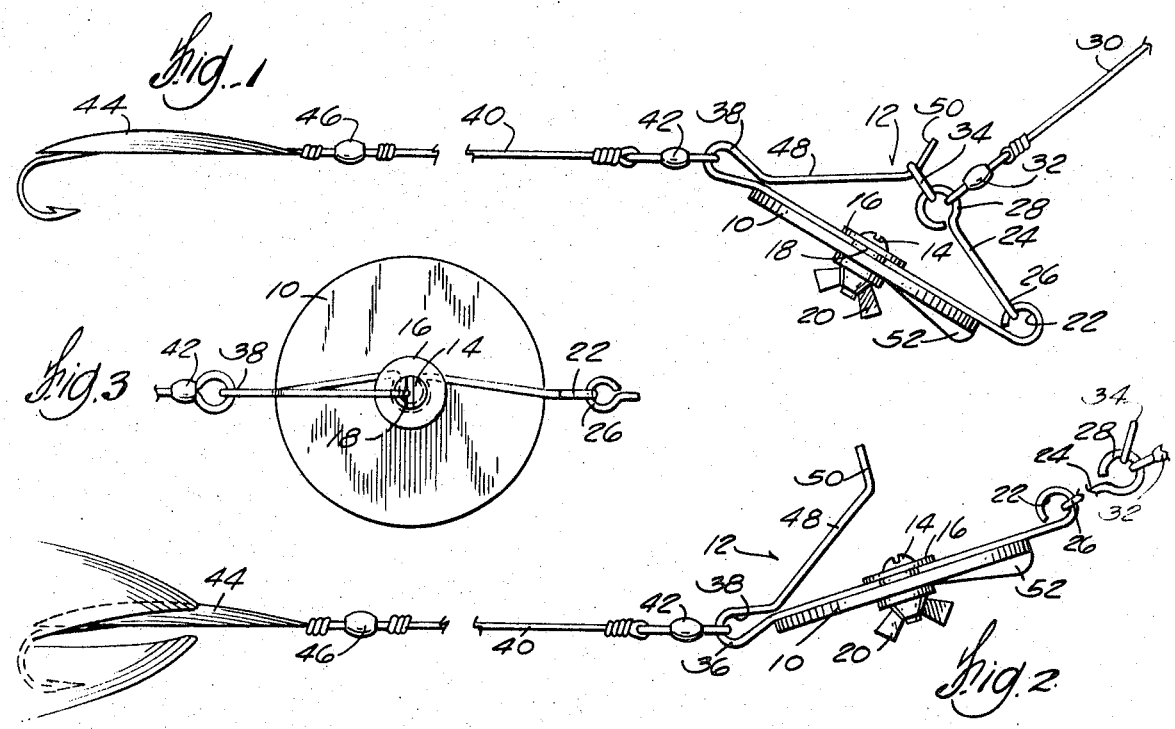
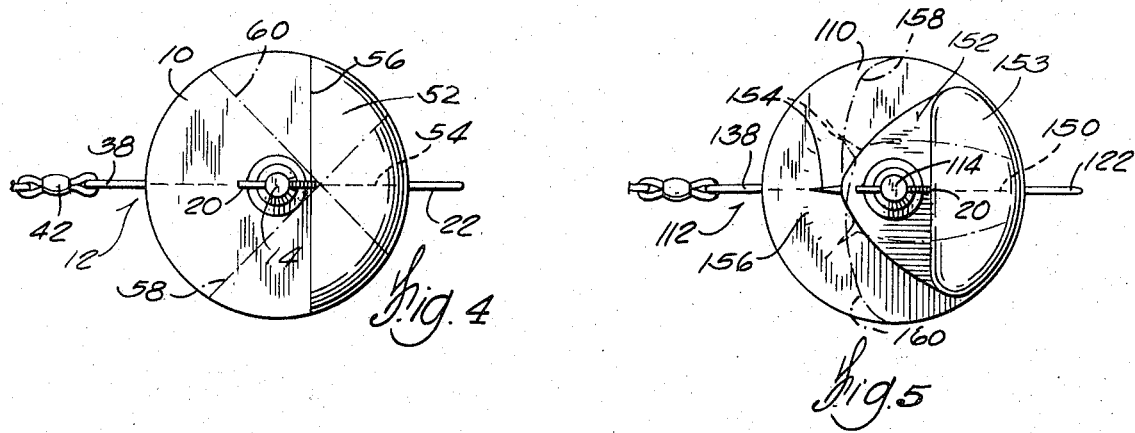
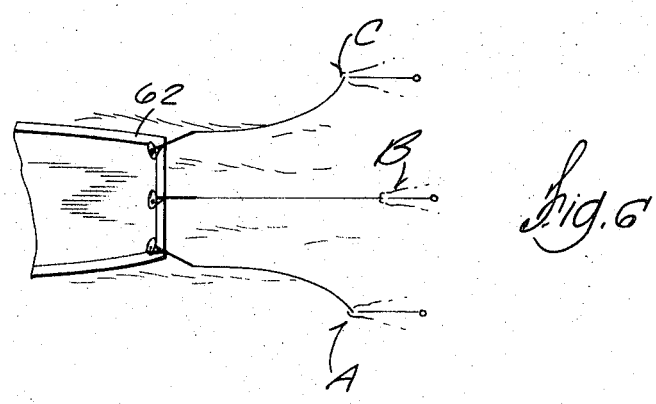

3,844,059

FISHING DEVICE

BACKGROUND OF THE INVENTION

In trolling for ocean fish or for deep feeding fresh water fish such as salmon or lake trout in the Great Lakes, it is often necessary to cause the bait to run quite deep, and for this reason special deep running sinkers have been devised in the past to carry the bait down to the required level. These deep running sinkers have a flat member which is maintained at an angle to the trolling line during trolling, and causes the sinker to dive when it is drawn through the water. When a fish strikes the bait, or when it is desired to reel the bait back into the boat, a tug on the line causes the flat member to snap into a position in alignment with the trolling line so that there will be a minimum of resistance to reeling in, whereby the bait, with or without a fish, can be more easily drawn to the surface.

In fishing for ocean or Great Lakes fish, the boats which are commonly used are relatively large, and may have room for several people to troll off the stern of the boat. Therefore, a problem arises of keeping the various fishing lines and baits separated during trolling to avoid entangling the lines. In the past, outriggers have sometimes been used to separate the outermost fishing lines from the inner fishing lines, and directional sinkers have been employed which controlled either the lateral position of the lines or the depth. Typical of the devices are those of Hamilton U.S. Pat. No. 2,924,907 and Morse U.S. Pat. No. 3,362,099. In the device of the Hamilton patent the lines may be connected in such a way that the flat portion which is in one plane can serve to cause a diving action to control the depth of the bait or, by connecting the lines in a different manner, the lateral position of the bait with respect to a boat may be controlled. In Hamilton the weight is not shiftable from one side to the other of the longitudinal center line of the device, and it is not possible with the Hamilton device to perform both the lateral control and diving functions without making complicated and time-consuming changes in the points of connection with the line. The Morse device is a directional sinker where depth is controlled by the weight of the member rather than by the causing of a diving action. Here, in order to control the lateral position with respect to the boat, it is necessary to unhook the line in two places and reconnect the lines on both sides of the sinker. The directional control is, of necessity, limited to the number of connection eyes which are provided.

This invention relates to a fishing device which performs the functions of a diving sinker as well as those of a directional sinker simultaneously, with the control for the lateral position of the line being readily and quickly varied by any selected amount within a reasonable range.

SUMMARY OF THE INVENTION

A diving sinker has a flat member normally so disposed as to cause the sinker to dive when it is drawn through the water. A weight is movably attached to the diving sinker and the position of the weight with respect to the axis of the trolling line of the device may be adjustably varied to control the lateral position of the bait with respect to the stern of a boat, whereby the device acts simultaneously as a diving sinker and a directional control.

DESCRIPTION OF THE DRAWINGS

FIG. 1 is a side view of one embodiment of the invention with the flat controlling member thereof positioned at an angle to the trolling line to cause the sinker to dive when it is drawn through the water.

FIG. 2 is a side view of the embodiment shown in FIG. 1 with the flat controlling member thereof positioned in general alignment with the trolling line to enable the sinker to be brought to the surface.

FIG. 3 is a top view of the flat controlling member in the embodiment shown in FIGS. 1 and 2.

FIG. 4 is a bottom view of the embodiment shown in FIGS. 1, 2 and 3.

FIG. 5 is a bottom view of a second embodiment of the invention.

FIG. 6 is a top plan view of the stern of a boat showing several people trolling.

DESCRIPTION OF THE PREFERRED EMBODIMENT

Referring to FIGS. 1 through 4, one illustrative embodiment of the invention includes a flat controlling portion 10 and a wire framework 12 which is attached to the portion 10 by a bolt 14 (see FIG. 4) whose head is on the top side of the portion 10 and fits against a washer 16. The bolt passes through a loop 18 in the wire framework 12 (see FIG. 3) and through a central hole in the member 10, there being a thumb nut 20 on the underside with a washer between the thumb nut and the portion 10. The thumb nut 20 is provided so that the connection between wire framework 12 and the controlling portion 10 may be conveniently loosened to allow for relative rotation for purposes that will be explained hereinafter.

The wire framework 12 is bent at its forward end to form an eye 22 to which a forward link 24 is loosely pivoted by means of an eye 26. A second eye 28 is formed at the other end of link 24 for receiving a fish line 30 which is attached to eye 28 by a conventional swivel 32. A separate ring 34 is loosely pivoted within eye 28 for reasons that will be explained hereinafter.

The rear end of wire framework 12 is doubled over at 36 to form an eye 38 for receiving a leader 40 which is attached thereto by means of a conventional swivel 42. Leader 40 is coupled to a spoon 44, or other bait, by a conventional swivel 46. The portion of the wire framework 12 above and ahead of eye 38 is extended to form a bendable arm 48 which terminates in a relatively shallow hook 50.

As best shown in FIG. 1, the dimensions of bendable arm 48 and forward link 24 are chosen so that the ring 34 may be engaged over hook 50 to orient the flat controlling member 10 at an angle to the fishing line 30 so that member 10 will tend to dive when it is drawn through the water.

As an important feature of the present invention, a lead weight 52 is cemented to the bottom of controlling member 10. When member 10 is drawn through the water, it dives until it reaches an equilibrium depth at which the downward pull of member 10 equals the upward pull on line 30.

The dimensions of arm 48, hook 50, and link 24 are selected in accordance with well known prior art techniques so that ring 34 will disengage from hook 50 when line 30 is sharply tugged, e.g. when a fish strikes spoon 44, or when line 30 is tugged by the fisherman. Disengagement of ring 34 from hook 50 allows forward link 24 to pivot forwardly and bring controlling portion 10 into alignment with line 30 as shown in FIG. 3. In this position, the diving sinker and spoon 44 can be easily drawn to the surface.

An important feature of the invention, as shown in FIG. 4, is that the lead weight 52 can be moved into an unbalanced relationship with the longitudinal center line 54 (FIG. 4) of the diving sinker. In the form of invention of FIG. 1, the lead weight 52 is rigidly attached to the bottom of controlling portion 10 and shifts when portion 10 is rotated. By loosening thumb nut 20, controlling portion 10 may be rotated to shift the center of gravity of lead weight 52 with respect to the center line 54, which causes a shift with respect to the axis of the trolling line. Thus it may be shifted to the left or right of center by any desired amount within its range of variation. Line 56 is the rear edge of lead weight 52 and FIG. 4 shows its position when its center of gravity is aligned with center line 54; broken line 58 shows one possible position for rear edge 56 of the weight when the center of gravity of weight 52 is to the left of center line 54; and broken line 60 shows a possible position for rear edge 56 of the weight when the center of gravity of weight 52 is to the right of center line 54.

When the center of gravity of weight 52 is to the left of center line 54 (as viewed from the front), the controlling portion 10 tips to the left, which causes portion 10 to move laterally to the right as indicated at position A in FIG. 6. The amount of lateral motion to the right depends upon the amount of tipping of controlling member 10, which in turn depends upon the distance between the center of gravity of weight 52 and the longitudinal center line 54. When the center of gravity of weight 52 is to the right of center line 54, the controlling member 10 will tip to the right, which causes member 10 to move laterally to the left, as indicated at position C in FIG. 6. When the center of gravity of weight 52 is aligned with center line 54, the controlling member 10 stays centered, as indicated at position B in FIG. 6. In each case, the controlling member 10 will move to a lateral position with respect to the boat 62 that is determined by the distance between the center of gravity of the lead weight 52 and the longitudinal center line 54 of the diving sinker assembly.

It is not necessary for the weight 52 to be rigidly affixed to the bottom of member 10. FIG. 5 is a bottom view of a second embodiment having an adjustment member 152 which is pivotally connected by a bolt 114 to the bottom of a fixed member 110. A weight 153 is rigidly secured to the adjustment member 152 as shown in FIG. 5. A wire framework 112 having a front eye 122 and a rear eye 138 is rigidly attached to the member 110. Adjustment member 152 has a pointer 154 which interacts with a scale 156 marked on the bottom of member 110. Adjustment member 152 may be pivoted to the left or right of the longitudinal center line 150 of the diving sinker as indicated by the dashed lines 158 and 160 to vary the position of weight 153. The length of scale 156 could be extended for further rotation if desired. As in the case of the previously described embodiment, the lateral position of this embodiment with respect to the boat 62 will be determined by the relationship between the center of gravity of weight 153 and the axis of the trolling line, which is determined by the relationship with the longitudinal center line 150 of the device. Thus, when the center of gravity of weight 153 is aligned with center line 150, the diving sinker will cause the trolling line to be generally aligned with the longitudinal axis of the boat 62 as at B in FIG. 6. When the center of gravity of weight 153 is to the right or left of center line 150, the diving sinker will be displaced to the left or right side, as at C or A, by an amount that depends on the distance between the center of gravity of weight 153 and the center line 150.

Other modifications of the disclosed structure will be apparent to those skilled in the art, and this invention includes all modifications that may fall within the scope of the following claims.

What I claim is:

1. In a diving sinker having a first connection to which a bait may be connected, and having a second connection to which a trolling line may be connected, the improvement comprising a weight movably connected to said diving sinker for movement from one side to the other with respect to the longitudinal center line of the diving sinker to control the lateral position of the diving sinker and bait with respect to a boat during trolling, and means for locking the weight in a selected position.

2. A diving sinker as claimed in claim 1 which includes a frame and a flat controlling portion, said flat controlling portion being pivotally connected to said frame, and said weight being eccentrically connected to said flat controlling portion, and said means for locking the weight in a selected position being means for locking the flat controlling portion in a selected position of rotation.

3. A diving sinker as claimed in claim 1 in which there is a frame provided with said first and second connections, and in which there is a flat controlling portion connected to said frame for causing the sinker to dive when it is drawn through the water.

4. A diving sinker as claimed in claim 3 in which the flat controlling portion is rotatably connected to said frame, in which there is a weight eccentrically carried by said controlling portion, and in which the means for locking the weight in a selected position includes nut and bolt means for adjustably locking the controlling portion in a selected position of rotation to dispose the weight on one side or the other of the longitudinal center line of the diving sinker or on said longitudinal center line.

5. A diving sinker as claimed in claim 3 in which there is an adjustment member pivotally connected to said flat controlling portion, wherein the weight is eccentrically carried by said adjustment member, and wherein the means for locking the weight is means for locking the adjustment member in a selected pivoted position on said flat controlling portion.

6. A diving sinker as claimed in claim 5 in which there is pointer on said adjustment member and a scale on said flat controlling member cooperable with said pointer to indicate the position of the weight with respect to the longitudinal center line of the diving sinker.

7. A diving sinker as claimed in claim 2 in which said frame comprises a length of wire bent at its forward end to form a forward eye for receiving a trolling line, and bent at its rear end to form a rear eye for receiving a leader to which bait may be connected, and further comprising a loop in said wire intermediate its forward and rear eyes forming a bearing for the pivotal connection for the controlling portion, and wherein the means for adjusting the position of the weight includes a bolt passing through the controlling portion and through the loop of said wire.

8. A diving sinker as claimed in claim 7 in which the connection with the forward eye includes a swingable link, and in which there is means for releasably holding the swingable link in a position to cause diving.

* * * * *